United States Patent [19]

Petito et al.

[11] Patent Number: 4,890,112

[45] Date of Patent: Dec. 26, 1989

[54] TIME MULTIPLEXED RADAR LINK

[75] Inventors: Michael D. Petito, Goffstown; Peter Redes, Hollis, both of N.H.

[73] Assignee: Raytheon Company, Lexington, Mass.

[21] Appl. No.: 272,025

[22] Filed: Nov. 16, 1988

Related U.S. Application Data

[63] Continuation of Ser. No. 67,196, Jun. 29, 1987, abandoned.

[51] Int. Cl.⁴ .............................. G01S 7/04; H04J 7/02
[52] U.S. Cl. ...................................... 342/58; 342/176; 370/78
[58] Field of Search .................. 342/55, 58, 176, 138, 342/144; 370/78

[56] References Cited

U.S. PATENT DOCUMENTS

| | | | |
|---|---|---|---|
| 2,570,249 | 10/1951 | Kenyon | 342/58 |
| 2,607,035 | 8/1952 | Levine | 370/78 X |
| 2,692,161 | 10/1954 | Allen . | |
| 2,736,007 | 2/1956 | Kenyon | 392/58 |
| 2,795,780 | 6/1957 | Gross et al. | 342/58 |
| 2,915,746 | 12/1959 | Prins | 342/58 |
| 3,040,313 | 6/1962 | Knausenberger | 342/58 |
| 3,713,146 | 1/1973 | Carroll et al. | 342/58 |
| 4,348,693 | 9/1982 | Cauldwell | 342/55 |
| 4,490,722 | 12/1984 | Rounion et al. | 343/394 |
| 4,590,569 | 5/1986 | Rogoff et al. | 364/452 |

Primary Examiner—Thomas H. Tarcza
Assistant Examiner—Gilberto Barrón, Jr.
Attorney, Agent, or Firm—Steven C. Stewart; William R. Clark; Richard M. Sharkansky

[57] ABSTRACT

A time multiplexer for linking a trigger signal, a video signal, and data signals generated by a radar transceiver to a radar display. The multiplexer is particularly useful when the transceiver is located remotely from the display, such as is commonly encountered in commercial marine radars.

The multiplexer provides a multiplexed signal having a first trigger portion with a logic high voltage, followed by a unipolar video portion having a maximum voltage less than the logic high voltage. The video portion is immediately followed by a data portion that is also unipolar but with a polarity opposite that of the video portion. Detection of the data portion may be expedited by including a synchronization preamble.

The multiplexer makes efficient use of a link between radar transceiver and radar display by using a pulse repetition frequency output of the transceiver to select which of the trigger, video, or data signals is to be sent at a particular time.

Appropriate detection circuits for providing a reconstructed trigger, video, and data signal at the display are also disclosed. A synchronous detector and error circuits are also described.

29 Claims, 10 Drawing Sheets

TIME MULTIPLEXED RADAR LINK

This application is a continuation of application Ser. No. 067,196 filed June 29, 1987, now abandoned.

This invention relates to radar systems, and particularly to a time multiplexer for linking a radar signal generator to a radar display.

BACKGROUND OF THE INVENTION

A radar system usually includes an antenna, a radar transceiver, and a radar display. The radar transceiver sends pulse signals to the radar antenna. The pulse signals are then transmitted by the antenna as an electromagnetic wave. The electromagnetic wave is reflected by objects within the range of the radar system and is returned to the antenna as received signals. The antenna also serves to couple these received signals to the radar transceiver. The radar transceiver operates on the received signals to develop a video signal suitable for presentation to the radar display. Typically, the radar transceiver also provides synchronization for the video signal in the form of a trigger signal. Most modern radars develop digital data signals to present to the radar display. The digital data signals may include various status information such as current antenna position, pulse repetition frequency, and data sychronization information. The radar display operates on the video, trigger, and data signals to create a visual presentation of objects within the range of the radar together with the status information.

It is thus necessary to send video, trigger, and data signals from the radar transceiver to the radar display. Sometimes the radar transceiver is located away from the radar display, such as in the case of a marine radar where the antenna and transceiver are typically located at the top of a ship's mast and the display is located inside the ship's bridge. This situation also occurs in radars adapted for harbor surveillance as it is common to have several remote radar antennas linked via radio to a control center having several radar displays located within it. In such instances it is desirable to minimize the number of transceiver to radar display links.

Some prior systems have solved this problem using a technique known as time multiplexing. In this technique, time periods are pre-assigned for transmission of each of the trigger, video, and data signals over a single link from the transceiver (originating end) to the display (receiving end). Because the time duration of the video signal varies as the range and/or pulse repetition frequency setting of the transceiver, this approach invariably requires the receiving end to have prior knowledge of the time duration and location of the trigger, video and data. To achieve this requires complex timing circuits at the demultiplexer and either prior knowledge of a change in timing or a slow response to changes made by the originating end. This results in not using all the available time on the link. An alternate approach for maximizing the use of a link is frequency multiplexing, where each of the signals to be transmitted is multiplexed onto a different radio frequency carrier signal. This allows more efficient time use of the link by enabling parallel transmission. However, frequency multiplexing is typically more expensive to implement than time multiplexing.

Many television systems solve the problem of sending both trigger and video signals on a single link by sending a trigger pulse before the video signal, with the video signal having a maximum voltage level less than the minimum high trigger voltage. Other television systems send a trigger pulse having an inverted polarity. This technique can be used to scramble the the video signal so that only displays capable of operating with an inverted trigger signal may use the video signal.

SUMMARY OF THE INVENTION

It is thus an object of this invention to provide an apparatus for time multiplexing trigger, video, and data signals from a radar transceiver onto a single link, making maximum use of available time without resorting to frequency multiplexing.

It is another object to provide such an apparatus where the beginning and ending of the trigger, video, and data signals are easily detectable at the receive end of the single link, without requiring prior knowledge of their time duration.

These and other objects are accomplished by a radar signal processor featuring a periodic output signal having a trigger portion at a minimum voltage greater than an output video signal's maximum voltage. The trigger portion occurs first, followed by a video portion corresponding to the video signal. The data signal is fed as a data portion of the output signal, the data portion having a polarity opposite the polarity of the video signal and after the end of the video portion. The data portion may include a synchronization preamble in order to indicate the beginning of the data portion.

A time multiplexer associated with such a system thus features a circuit operates on a trigger signal, a video signal, and a data signal to select one of the trigger signal, video signal, or data signal as an output signal at a particular instant in time. The multiplexer uses a pulse repetition frequency signal indicative of the duration of the video signal to construct the output signal.

The multiplexer may be embodied, for example, as a digital counter circuit arranged to be initialized by the occurrence of the end of the trigger signal. The counter is fed the range indication signal so that the end of the video period may be determined. When the end of the video period occurs, the data signal is selected to be the multiplexer output.

The multiplexer may include at least one switch for selecting one of two input signals as a selected signal and a summing amplifier for summing the selected signal with a third output signal. The third input signal is selectively enabled or disabled to the summing amplifier input.

An important advantage of this arrangement is that only one link need be fed between the radar signal processor and the radar display. This significantly increases reliability as compared to systems requiring more than one link. It also is achieved at a lower cost when compared to frequency multiplexing systems.

BRIEF DESCRIPTION OF THE DRAWINGS

These and other objects, features, and advantages become evident from examination of the following detailed description when read together with the drawings where.

DETAILED DESCRIPTION OF THE PREFERRED EMBODIMENTS

Figure 1:
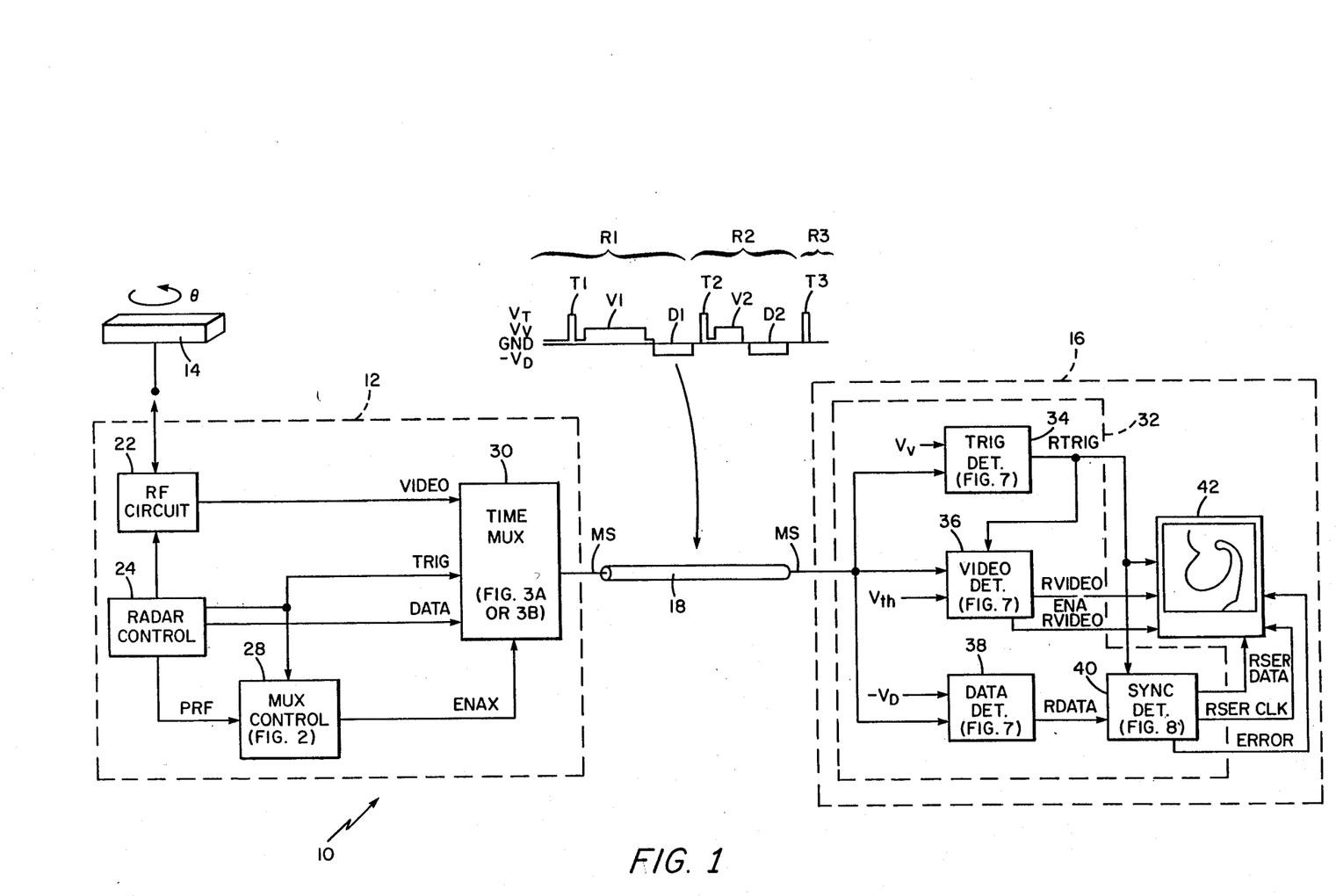
FIG. 1 is a block diagram of a radar system in accordance with the invention.

Now referring more particularly to the drawings, where like reference characters designate corresponding parts throughout the several figures, the invention is shown in FIG. 1 as a radar system 10 including a radar transceiver 12, radar antenna 14, radar display 16, and link 18. The transceiver 12 provides signals to and receives signals from radar antenna 14, and develops a time multiplexed signal MS having portions deriving from and corresponding to a trigger signal, a video signal, and a data signal. The multiplexed signal MS is fed along link 18 to radar display 16. A representative portion of multiplexed signal MS is shown. It includes periodic sections such as R1 and R2. Section R1 includes a trigger portion T1 having a maximum voltage $V_T$. This is followed by a video portion V1. Video portion V1 is a unipolar signal corresponding to the video signal and having a maximum positive voltage $V_V$ less than $V_T$. The data portion D1 follows video portion V1. Data portion D1 is a unipolar signal having a polarity opposite the polarity of video portion V1 with a maximum negative voltage of $-V_D$. A second section R2 of multiplexed signal MS occuring sometime after section R1 similarly includes trigger portion T2, video portion V2, and data portion D2. Trigger portion T2 and data portion D2 correspond to portions T1 and D1 of section R1, respectively. It is seen that video portion V2 is shorter in time than video portion V1 of section R1. However, there is no blanking or unused time in portion R2 caused because of the shortened duration of video portion V2. Data portion D2 of section R2 may 5 immediately follow video portion V2, and another trigger portion T3 of section R3 after data portion R2. The use of link 18 has thus been maximized.

It can also be seen from FIG. 1 that radar transceiver 12 comprises a radio frequency (RF) circuit 22, radar control portion 24, multiplexer control 28, and time multiplexer 30. RF circuit 22, responsive to commands from radar control circuit 24, provides output radar pulse signals to be transmitted to antenna 14. These pulse signals are propagate by antenna 14 and reflected by objects in the vicinity of radar system 10. The reflected signals are received by antenna 14 as a received signal and returned to RF circuit 22. RF circuit 22 operates on this received signal to develop a VIDEO signal representing the video portion of a multiplexed signal MS to be used by display 16 to provide a picture of objects in the vicinity of radar system 10. Radar control 24 provides a TRIG signal and a DATA signal representing the trigger portion and data portions of signal MS. The TRIG signal serves to mark the start of the VIDEO signal. The DATA signal is used to communicate current status of radar system 10 including, for example, current position of antenna 14 and pulse repetition frequency. Radar control 24 also outputs a separate indication of pulse repetition frequency as a PRF signal indicative of the pulse repetition interval of radar transceiver 12. This PRF signal is fed to multiplexer control circuit 28. The DATA and TRIG signals are fed from radar control 24 together with the VIDEO signal from the RF circuit 22 to time multiplexer 30. Multiplexer control circuit 28 provides a select signal ENAX to time multiplexer 30. The state of the select signal ENAX indicates which of the three inputs TRIG, VIDEO, or DATA to time multiplexer 30, should be selected as the current portion of multiplexd signal MS. Multiplexed signal MS is coupled to one end of link 18.

Radar display 16 includes a time demultiplexer 32 and a plan position indicator (PPI) 42 to provide a picture of objects in the vicinity of radar system 10. Time demultiplexer 32 operates on the multiplexed signal MS received at the other end of link 18 to provide three signals, RTRIG, RVIDEO, and RDATA representing reconstructed versions of the TRIG, VIDEO, and DATA signals originating at radar signal generator 12. Additionally, time demultiplexer 32 provides appropriate enable, clock, and error signals, to allow the PPI 42 to use the reconstructed signals RTRIG, RVIDEO, AND RDATA.

More particularly, time demultiplexer 32 includes a trigger detector 34, video detector 36, and data detector 38. Data detector 38 feeds a sychronous detector 40. Trigger detector 34 provides the reconstructed trigger signal RTRIG by comparing the multiplexed signal MS with maximum video voltage $V_V$, and passing only those portions of multiplexed signal MS having a voltage greater than $V_V$. Similarly, video detector 36 provides the reconstructed video signal RVIDEO by using reconstructed trigger RTRIG and comparing the multiplexed signal MS with a threshold voltage $V_{th}$. RVIDEO is thus determined to be the portions of multiplexed signal MS having a voltage above $V_{th}$ and occurring outside of reconstructed trigger RTRIG. Data detector 38 similarly compares multiplexed signal MS with a voltage $-V_D$ and uses reconstructed trigger RTRIG to provide the reconstructed data portion RDATA. RDATA is determined to be the portions of multiplexed signal MS below $-V_D$ and occurring outside of RTRIG. If needed, synchronous detector 40 is used to develop a recovered serial data signal RSER DATA and clock signal RSER CLK from the recovered trigger RTRIG and recovered data RDATA. Additionally, sychronous detector 40 may include circuits to determine when an error in data detection has occurred, and output such information as an error signal ERROR.

Figure 2:
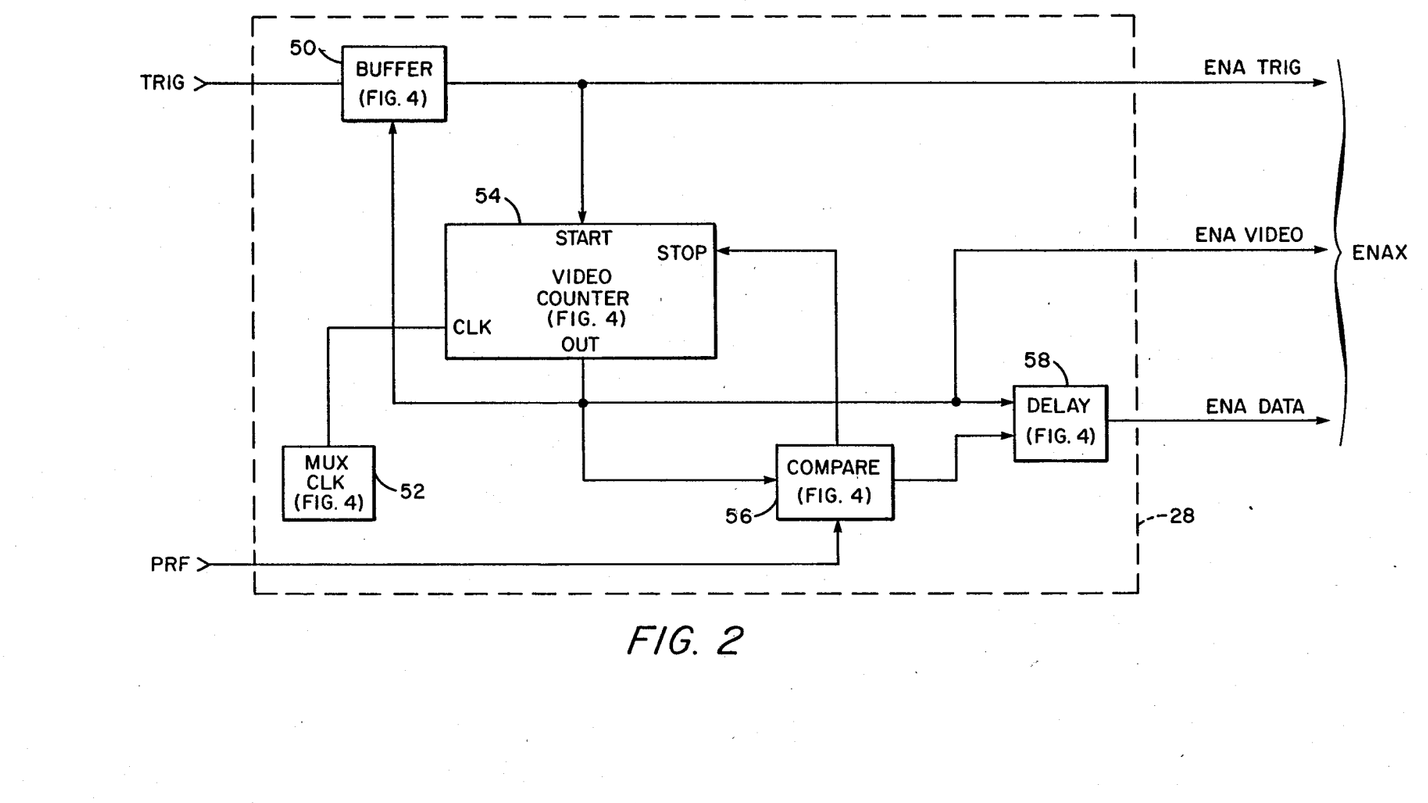
FIG. 2 is a more detailed block diagram of a multiplexer control circuit.

Returning attention to radar signal processor 12, FIG. 2 shows multiplexer control 28 with more detail. Multiplexer control 28 uses the TRIG signal and the PRF signal to develop appropriate enable signals ENAX to control time multiplexer 30. In the embodiment shown, multiplexer control 28 develops three separate enable signals ENA TRIG, ENA VIDEO, and ENA DATA. Multiplexer control 28 includes a buffer 50, a multiplexer clock generator 52, a video counter 54, a digital comparator 56, and digital delay 58. The TRIG signal is fed to a buffer 50 for amplification and shaping to provide the enable trigger signal ENA TRIG. Video counter 54 serves to time the video portion of multiplexed signal MS. In particular, video counter 54 is driven by an appropriate digital multiplexer clock generator 52 at its CLK input. The occurrence of the end of the ENA TRIG signal is used to initialize and start video counter 54. The output signal OUT from video counter 54 is fed to digital comparator 56 together with the PRF signal. Digital comparator 56 provides an appropriate signal to the stop input STOP of video counter 54 when the end of the video portion has been reached, as indicated by the output signal OUT of video counter 54. This may also be used to reset buffer 50. Signal OUT is also fed to provide an enable video signal ENA VIDEO having a true state only after video counter 54 has received a START signal command but before a STOP signal is received. The occurrence of the end of ENA VIDEO may be detected by feeding video counter output OUT to digital delay 58. This can thus be used to develop the enable data signal ENA DATA. Multiplexer control 28 is shown with more detail in FIG. 4.

Figure 3A:
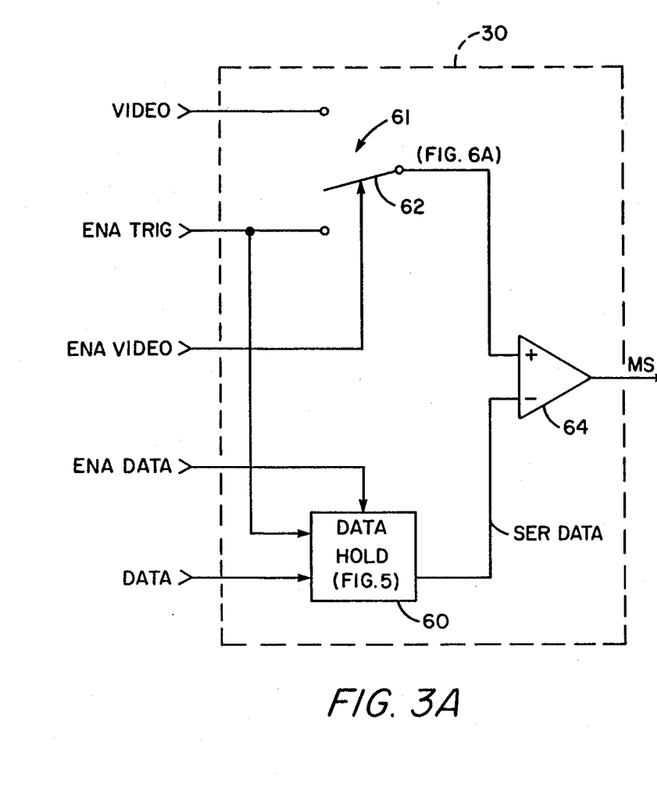
FIGS. 3A AND 3B are block diagrams of alternate arrangements for the time multiplexer.
Figure 3B:
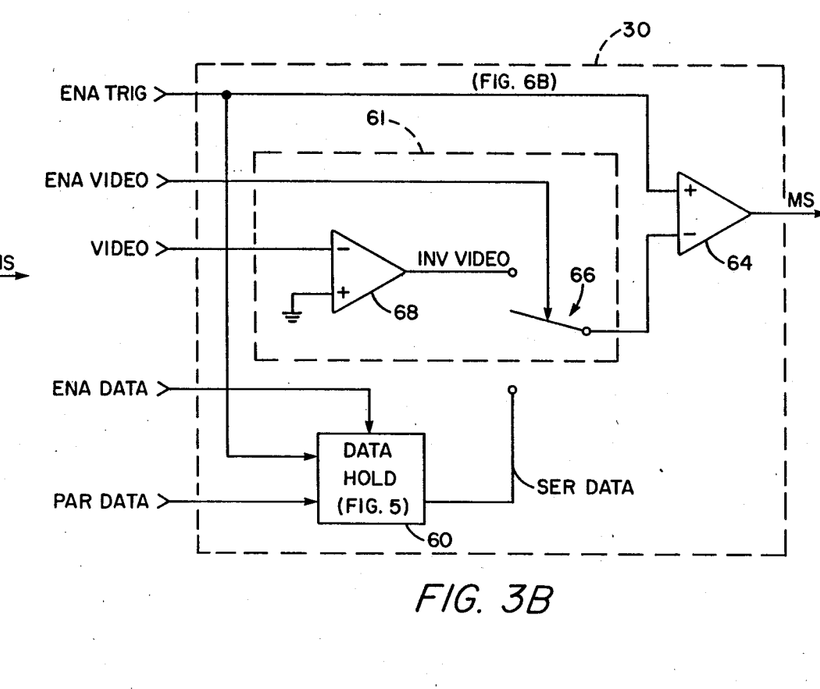

FIGS. 3A and 3B show embodiments of time multiplexer 30. Both embodiments use the VIDEO, DATA, ENA TRIG, ENA VIDEO, and ENA DATA signals to provide the multiplexed signal MS. The embodiment for time multiplexer 30 shown in FIG. 3A is seen to include a data hold circuit 60, analog selector 61, and summing amplifier 64. Analog selector 61 is embodied as an analog switch 62 having the VIDEO signal and ENA TRIG signal fed to its inputs. The ENA VIDEO signal is used to control the position of analog switch 62 to select one of the input signals to be fed to a non-inverting input of summing amplifier 64. The signals ENA DATA and DATA are fed to data hold circuit 60. Data hold circuit 60 stores the DATA signal until the ENA DATA signal reaches a true state. Upon such occurrence, data hold circuit 60 provides the data as a serial data signal SER DATA to the inverting input of summing amplifier 64. The output of summing amplifier 64 is the multiplexed signal MS.

In an alternate embodiment of FIG. 3B for time multiplexer 30, the circuit again includes an analog selector 61, a data hold circuit 60, and summing amplifier 64. However, in this embodiment, the ENA TRIG signal is directly fed to the non-inverting input of summing amplifier 64. Analog selector 61 includes an inverting amplifier 68 and analog switch 66. Inverting amplifier 68 is fed the VIDEO signal and provides a polarity inverted version thereof as an inverted video signal INV VIDEO. The INV VIDEO signal is fed to one of the inputs of analog switch 66. The other input of analog switch 66 is coupled to the SER DATA signal output from data hold circuit 60. Analog switch 66 selects one of the INV VIDEO or SER DATA signals as an output signal fed to the inverting input of summing amplifier 64 in accordance with the state of the ENA VIDEO signal.

Regardless of whether the embodiment of FIG. 3A or 3B is used to implement time multiplexer 30, the end result is that a multiplex signal MS is formed having a trigger portion with a minimum true voltage greater than the maximum voltage of a following unipolar video portion, and a data portion following the unipolar video portion as a unipolar data signal having a polarity opposite the polarity of the video signal.

In the schematic diagrams shown in FIGS. 4 through 9, certain conventions are observed. Power supply connections to a positive logic supply such as $V_{cc}$ and a digital ground connection for the various digital logic chips have been left out for clarity. Digital ground connections are shown as a empty triangle, such as that indicated by reference numeral 81. Analog ground connections are depicted as three horizontal lines, such as that indicated by reference numeral 83 in FIG. 6A. Unused inputs of logic chips are not shown. For clarity purposes, certain logic signals are not continuously connected to all points but rather shown with labels inside of pentagon shapes, such as that indicated by the positive logic enable trigger signal T indicated by reference numeral 85.

Figure 4:
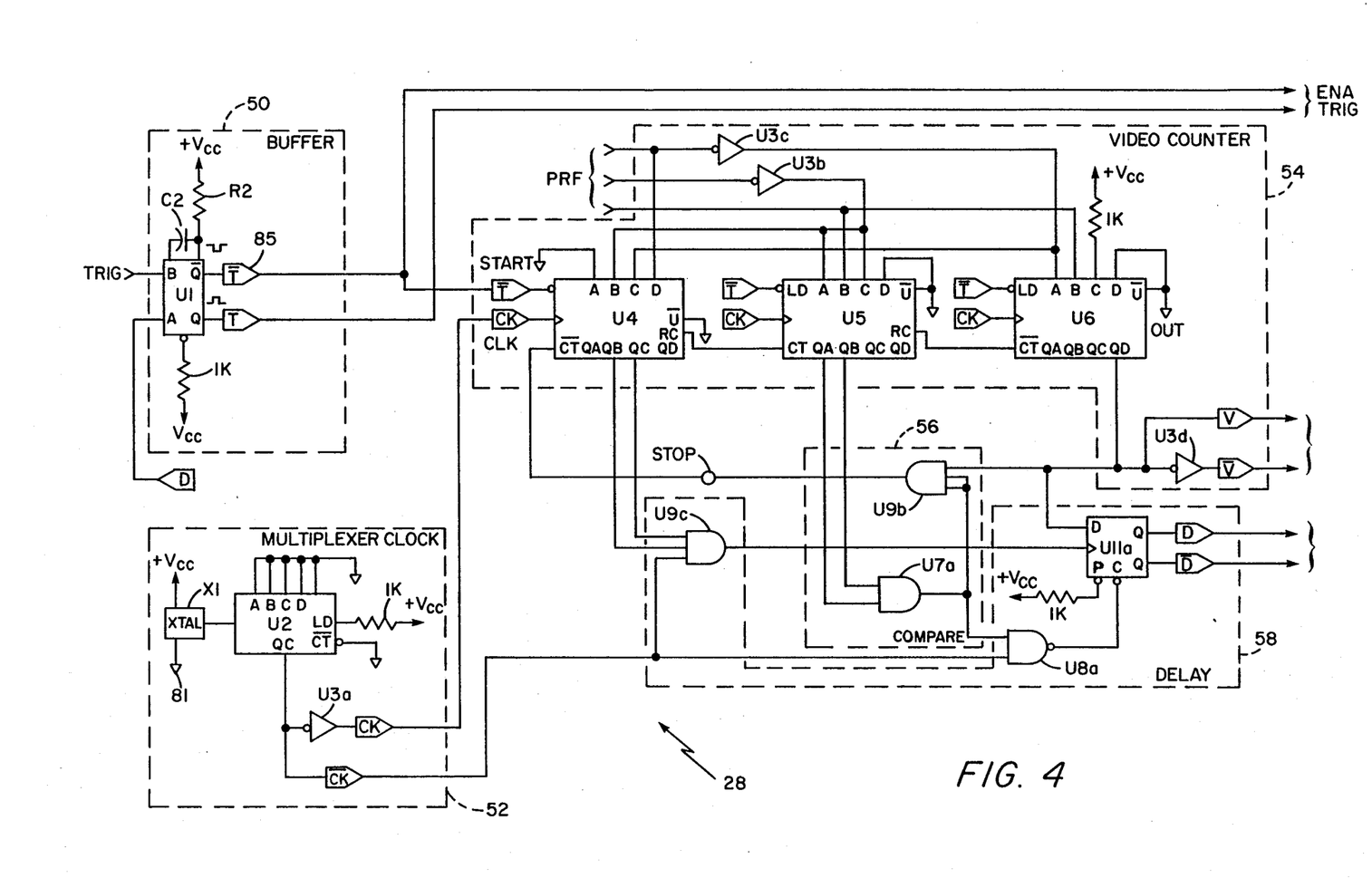
FIG. 4 is a schematic of the multiplexer control circuit shown in FIG. 2.

FIG. 4 shows various components of multiplexer control 28 and how it may be embodied as a circuit using standard logic components. Multiplexer control 28 includes buffer 50, multiplexer clock 52, video counter 54, and delay 58. Buffer 50 is implemented as monostable multivibrator U1, output pulse timing resistor R2 and capacitor C2. Monostable multivibrator U1 provides a positive logic pulse at its Q output upon occurrence of a positive transition at its B input. The trigger signal TRIG is fed to the B input of U1. Its clear input CLR is disabled by tying it to the positive voltage supply through a 1 K ohm pull-up resistor. Pulse timing resistor R2 and capacitor C2 determine the width of the output pulse at output Q. Another enable input A, if present, may be tied to portions of delay circuit 58, as will be described. The output of monostable multivibrator U1 is thus a positive logic pulse T and negative logic pulse $\overline{T}$. Signals T and $\overline{T}$ form positive and negative logic versions, respectively, of the enable trigger signal ENA TRIG.

Multiplexer clock 52 includes a crystal X1 feeding a digital counter U2 and that in turn feeds inverter U3a to provide a clock signal CK and its logical inverse $\overline{CK}$. Crystal X1 is one having a resonant frequency eight times the desired clock frequency. Its output 0 is fed to the clock input of counter U2. The preload inputs A through D of counter U2 are grounded. An up-down control input $\overline{U}$, count enable $\overline{CT}$ and load enable LD are enabled by tying them, respectively, to ground, ground, and to $V_{cc}$ through a 1 K ohm pull-up resistor. The divide by eight output $Q_c$ is used as the $\overline{CK}$ signal, and the inverter U3a tied to $Q_c$ provides the CK signal.

Video counter 54 is formed of one or more cascaded counters. The number of counters required depends upon the duration of the video portion. Here, video counter 54 is shown including three, four-bit digital counters U4, U5, and U6. The PRF signal is fed to the preload inputs A through D of each counter U4, U5, and U6. Video counter 54 is arranged to count up from the preload input to a maximum value occurring when $Q_d$ of the most significant counter U6 is a one and the lower order bits of U6 and the bits of U4 and U5 are zeros. Up counting is selected by tying the up-down control U of U4, U5, and U6 to ground. Inverters U3b and U3c may be used to provide inputs to the preload inputs A through D. The $\overline{LD}$ input of each cascaded counter U4, U5, and U6 is tied to the $\overline{T}$ signal. The clock signal CK drives their clock inputs. As described in detail shortly, digital comparator 56 develops a STOP signal fed to the count enable $\overline{CT}$ of the least significant order counter U4. The ripple carry RC output of U4 is fed to the $\overline{CT}$ input of U5 in cascade fashion. In operation, video counter 54 is loaded with the range value from the PRF signal upon occurrence of the negative trigger pulse $\overline{T}$. Counter 54 then proceeds to count until digital comparator 56 determines that the maximum count has been reached. The STOP signal fed from digital comparator 56 then inhibits counting. The occurrence of another trigger pulse $\overline{T}$ repeats the process.

Delay circuit 58 serves to delay both the output of digital comparator 56 as well as video counter 54, to provide the ENA DATA signal. The ENA VIDEO signal is developed from the most significant output bit of video counter 54, here shown to be $Q_d$ of U6. Signal V is the positive logic version of ENA VIDEO. An inverter U3d provides the inverted logic polarity $\overline{V}$. Delay 58 includes several and gates U9c and U7a to determine when, after the expiration of a certain number of clock pulses (here selected to be 48 as the $Q_a$ and $Q_b$ of U5 is fed to and gate U7a and then to and gate U9b), compare circuit 56 will provide a logic high true STOP signal to stop cascaded counters U4, U5, and U6 from counting.

Delay 58 includes and-gate U9c and nand-gate U8a and D flip-flop U11a. The D input of D flip-flop U11a is fed from the $Q_d$ output of U6. The clock input of U11a is coupled to the output of U9c which is tied to $Q_b$ and $Q_c$ of U4 as well as the converted clock signal $\overline{CK}$. In operation, upon the occurrence of six clock pulses in signal $\overline{CK}$ after the assertion high of $Q_d$ of U6, the Q output of U11a goes high, indicating that the ENA DATA signal should be made true. After the occurrence of an additional 48 clock pulses, at the same time when compare circuit 56 has determined the end of the VIDEO signal has occurred, the output of U7a becomes high and thus the output of U8a drops low to cause U11a to be cleared. The outputs of D and $\overline{D}$ of U11a represent the true and inverted logic versions of the ENA DATA signal.

Figure 5:
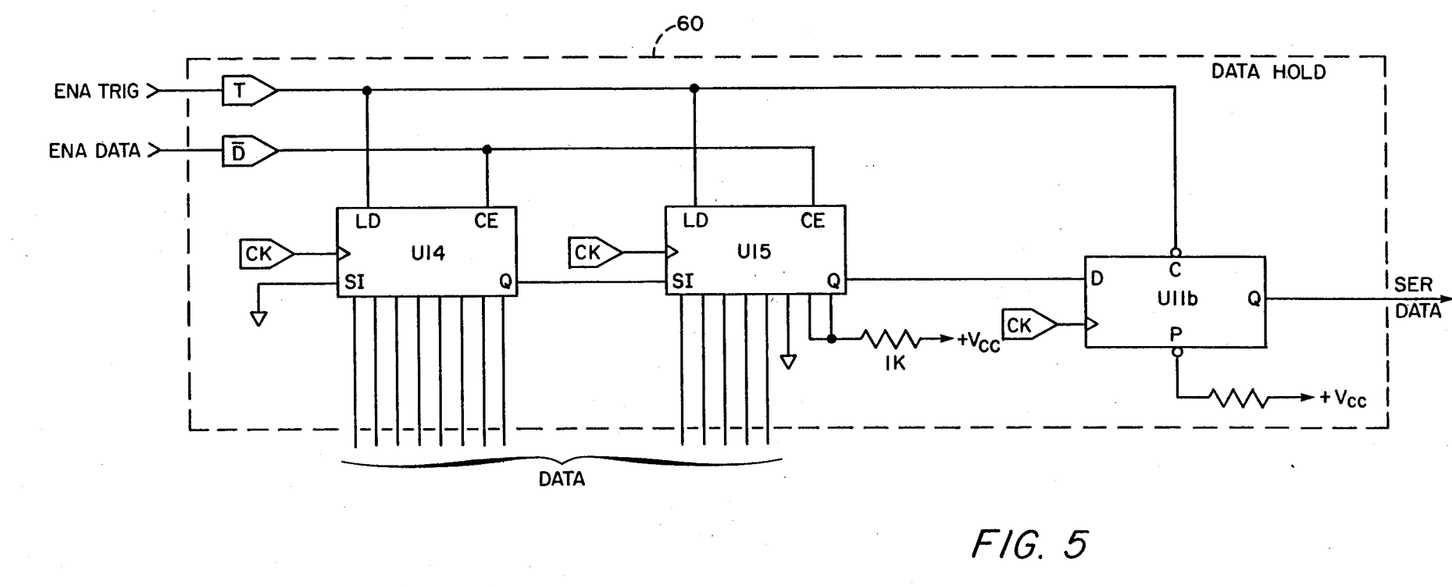
FIG. 5 is a schematic of the data hold circuit shown in FIGS. 3A and 3B.

FIG. 5 shows data hold 60 forming a portion of time multiplexer 30. This embodiment accepts a DATA signal in parallel form, and uses the ENA TRIG and ENA DATA signals to hold DATA until the data portion of the multiplexed signal MS is to be transmitted. It then provides the DATA signal in serial fashion as the SER DATA signal. The DATA signal is fed to parallel inputs PI of cascaded parallel to serial registers U14, U15. While shown are two cascaded parallel to serial registers U14, U15, more registers may be cascaded by tying the Q output of a lower order register to the serial input SI of a higer order register. A clock signal CK is fed to the clock inputs of the parallel to serial registers U14, U15. Parallel inputs PI are stored on the occurrence of trigger enable ENA TRIG by having the load inputs $\overline{LD}$ coupled to the $\overline{T}$ signal. The DATA is made available in serial form on occurrence of the ENA DATA signal by tying signal $\overline{D}$ to the chip enable $\overline{CE}$ inputs of registers U14, U15. The DATA signal in serial form is available at the serial output Q of the higher order register U15. A D flip-flop U11b may be coupled to the serial output Q of U15. By coupling the signal $\overline{T}$ to the inverted clear input of U11b, and using the output Q of U11b as the serial data signal SER DATA, it is insured that the SER DATA signal has a logic low value before registers U14, U15 are enabled to output. The clock input of U11b is also tied to the clock signal CK. The use of D flip-flop U11b insures that the SER DATA signal is a logic low level during the times when DATA is not to be sent. This is important, as SER DATA is directly fed as an input to summing amplifier 64 to create multiplex signal MS.

A sychronization preamble portion of SER DATA may be used to further ease the detection of the beginning of the data portion of multiplex signal MS. This sychronization preamble is created by having the most significant bits 76 of the parallel inputs PI of the most significant register U15 always be at a known state. As shown in the figure, the preferred sychronization preamble is two logic ones followed by a logic zero, created by tying the two most significant parallel inputs PI to $+V_{cc}$ through a pull-up resistor of 1K ohm.

Figure 6A:
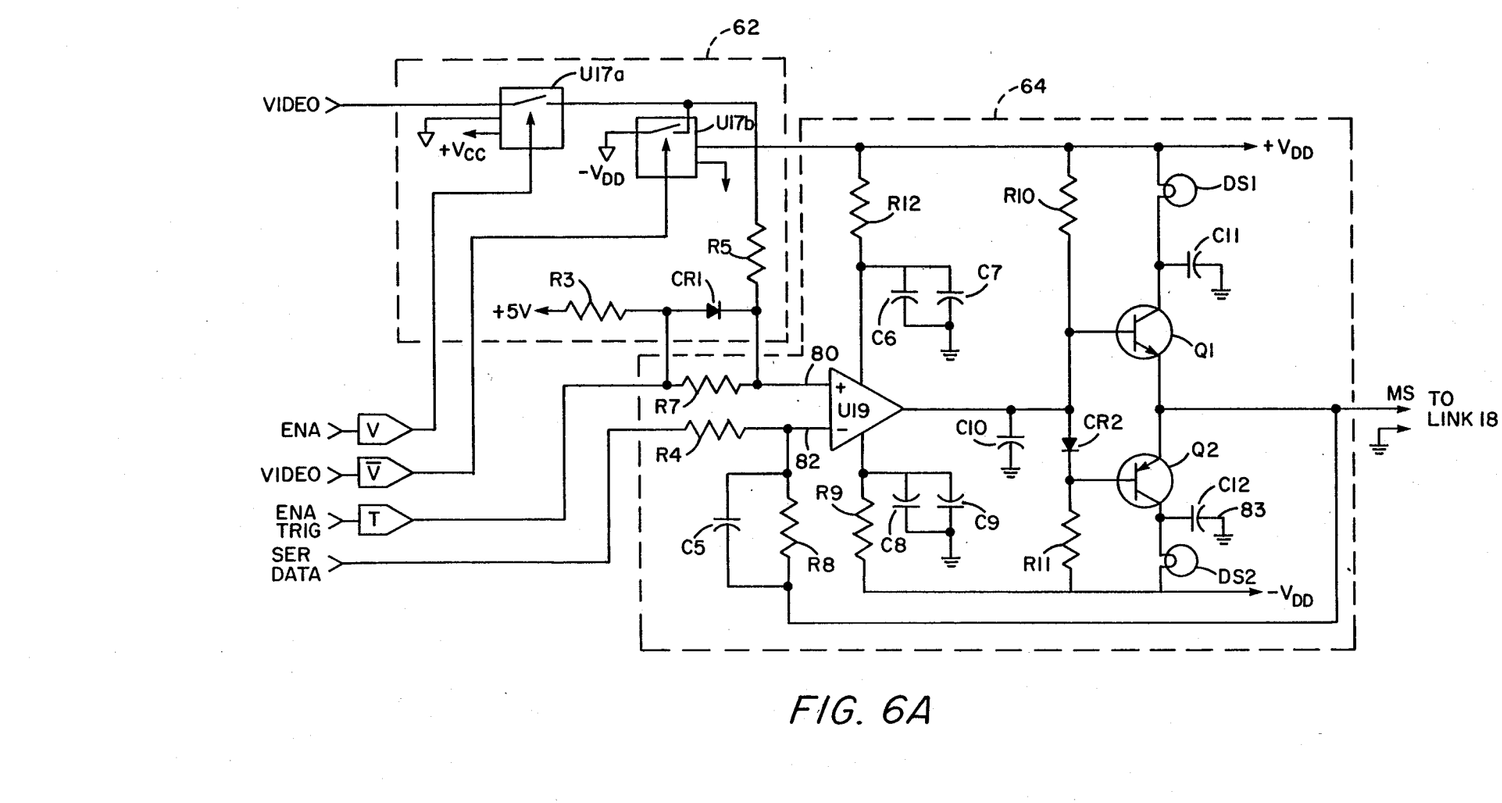
FIGS. 6A AND 6B are schematics of the analog selector shown in FIGS. 3A and 3B, respectively.

FIG. 6A shows greater detail of video trigger switch 62 and summing amplifier 64 forming part of the embodiment of time multiplexer 30 previously shown in FIG. 3A. Video trigger switch 62 includes two analog switches U17a and U17b, resistors R3, R5, and R7, and signal diode CR1. Video trigger switch 62 serves to select one of the ENA TRIG or VIDEO signals to be coupled to the non-inverting 80 input of summing amplifier 64. The VIDEO signal is coupled to a signal input of analog switch U17a. The signal input of switch U17b is tied to analog ground. The signal outputs of analog switches U17a and U17b are tied toqether and coupled to the non-inverting input 80 of summing amplifier 64 through series resistor R5. The ENA TRIG signal positive logic signal T is also coupled through a series resistor R7 to the non-inverting input 80. The open or closed state of switches U17a and U17b are controlled by the ENA VIDEO signal. In particular, the positive logic signal V and negative logic signal $\overline{V}$ are coupled to the control inputs of switches U17a and U17b. This allows the VIDEO signal to be coupled to the non-inverting input 80 when the ENA VIDEO signal indicates it is time time to enable the video portion of multiplex signal MS. This arrangement also insures that analog ground is fed through series resistor R5 to the non-inverting input 80 of summing amplifier 64 at all other times. Thus, the ENA TRIG signal may be directly fed through series resistor R7 having the same value as series resistor R5 to the non-inverting input 80 of summing amplifier 64. This provides proper impedance and amplitude control over the input to summing amplifier 64.

Summing amplifier 64 also has an inverting input 82 coupled to the SER DATA signal through series resistor R4.

Summing amplifier 64 may be embodied as a operational amplifier U19 and complimentary output driving transistors Q1 and Q2. Resistor R12 and a pair of series coupled capacitors C6 add C7 serve to regulate the current voltage from the $+V_{dd}$ supply to U19. Similarly, resistor R9 and capacitors C8 and C9 regulate the $-V_{dd}$ supply. Feedback resistor R8 and parallel capacitor C5 provide required feedback from the output of summing amplifier 64 to its inverting input. Output shunt capacitor C10 provides a high frequency path around diode DR2 to the bases of each of the complimentary transistors Q1 and Q2. Series resistors R10 and R11 provide appropriate voltage biasing for the bases of transistors Q1 and Q2. Diode CR2 is coupled between R10 and R11 to insure that the base voltage of transistor Q1 remains above the base voltage of transistor Q2. Collector capacitors C11 and C12 coupled to the collectors of transistors Q1 and Q2, respectively. These further regulate the $+V_{dd}$ and $-V_{dd}$ supplies, respectively, fed to each transistor. The multiplex signal MS is thus provided at the junction of the emitters of each of transistors Q1 and Q2.

Figure 6B:
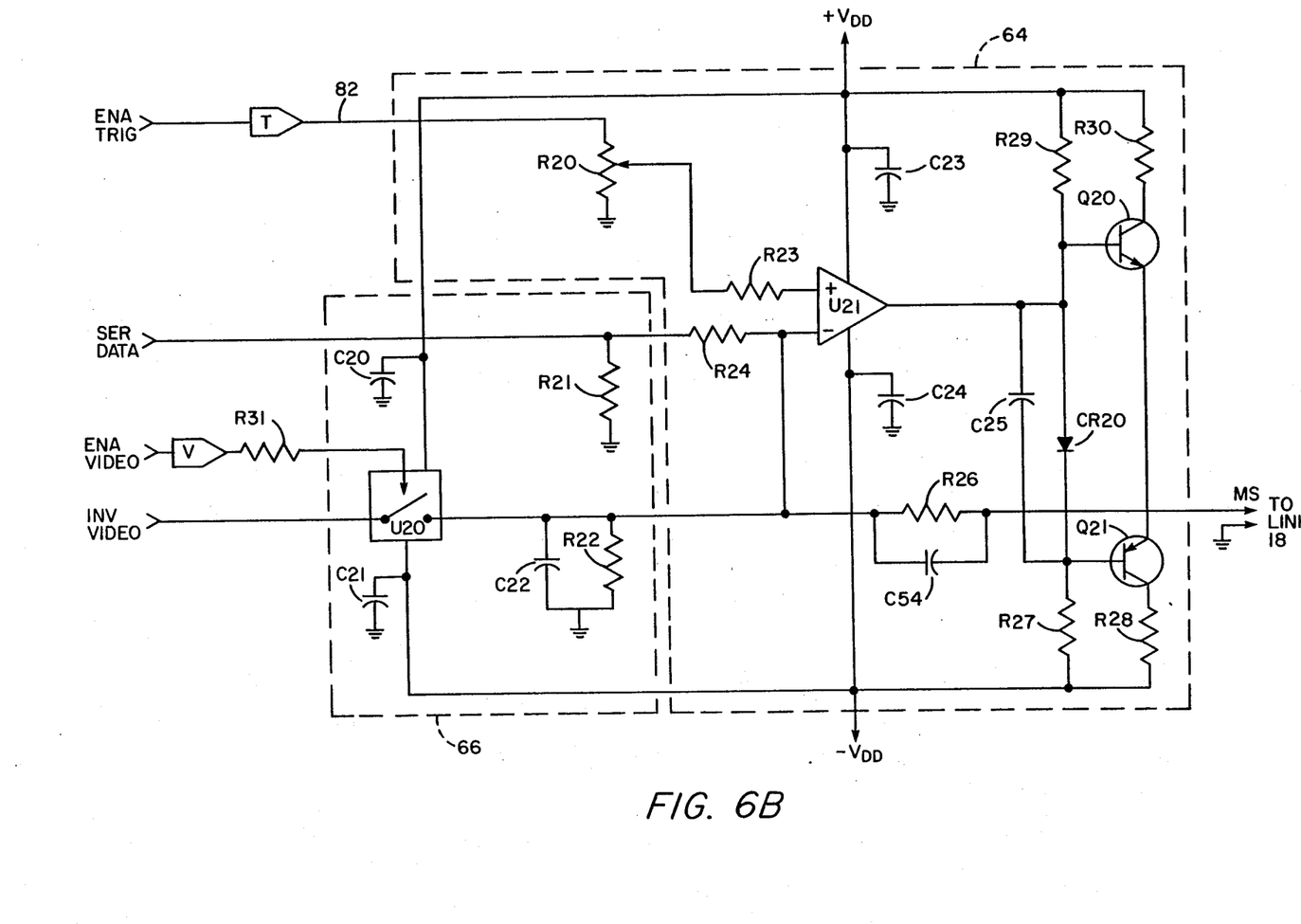

FIG. 6B is a more detailed view of portions of the embodiment of multiplexer 30 shown in FIG. 3B. In particular, it shows video data switch 66 and summing amplifier 64 with more detail. Video data switch 66 uses the ENA VIDEO signal to disconnect the INV VIDEO signal from the inverting input 80 of summing amplifier 64 during the serial data portion of MS. This is necessary to keep any wideband noise from entering multiplexer 30 which might corrupt the MS signal. Video data switch 66 includes analog switch U20, by-pass capacitors C20 and C21, series resistors R24 and R25, shunt resistors R21 and R22, and shunt capacitor C22. The INV VIDEO signal is fed to the signal input of switch U20. The state of switch U20 is controlled by the ENA VIDEO signal positive logic version V. By-pass capacitor C20 is coupled in parallel between the $+V_{dd}$ voltage supply and analog ground near switch U20. By-pass capacitor C21 serves the analogous purpose for the negative supply $-V_{dd}$. The signal output of switch U20 is coupled through series resistor R25 to the inverting input 80 of summing amplifier 64. Shunt resistor R22 and capacitor C22 provide filtering and proper amplitude setting of the video portion of multiplex signal MS. The SER DATA signal is also fed to the inverting input 80 through series resistor R24. R24 is selected to provide the proper amplitude for the data portion of multiplex signal MS. This is also determined in part by the resistance value of shunt resistor R20 coupled to the SER DATA signal and analog ground. In operation, when the video portion of multiplex signal MS is to be provided, as indicated by the ENV VIDEO signal, switch U20 closes, thereby coupling the INV VIDEO signal to the inverting input 80 of summing amplifier 64. At all other times, the INV VIDEO signal is disabled as switch U20 is opened, thereby enabling the SER DATA signal to the inverting input 80 of summing amplifier 64.

In this embodiment, the non-inverting input 82 of summing amplifier 64 is directly fed to the ENA TRIG signal as positive logic signal T. Shunt potentiometer R20 and series resistor R23 provide proper voltage setting for the trigger portion of multiplex signal MS. Supply by-pass capacitors C23 and C24 are coupled between the $+V_{dd}$ and $-V_{dd}$ supplies and the power inputs of an operational amplifier U21 that serves the summing function of summing amplifier 64. Feed-back resistor R26 and parallel capacitor C54 provide feedback from the output of summing amplifier 64 to its inverting input 80. Complimentary transistors Q20 and Q21 are arranged much as in FIG. 6A. Resistors R29 and R27 coupled between the voltage supplies and the bases of transistors Q20 and Q21 provide proper voltage bias as does the diode CR20. The output of operational amplifier U21 is coupled directly to the base of Q20. Its output is also coupled to the base of Q21 through series capacitor R25 and the diode CR20. Collector resistors R30 and R28 regulate the current through the collector of transistors Q20 and Q21, respectively. Light bulbs DS1 and DS2 may be included to indicate a shorted output condition.

Figure 7:
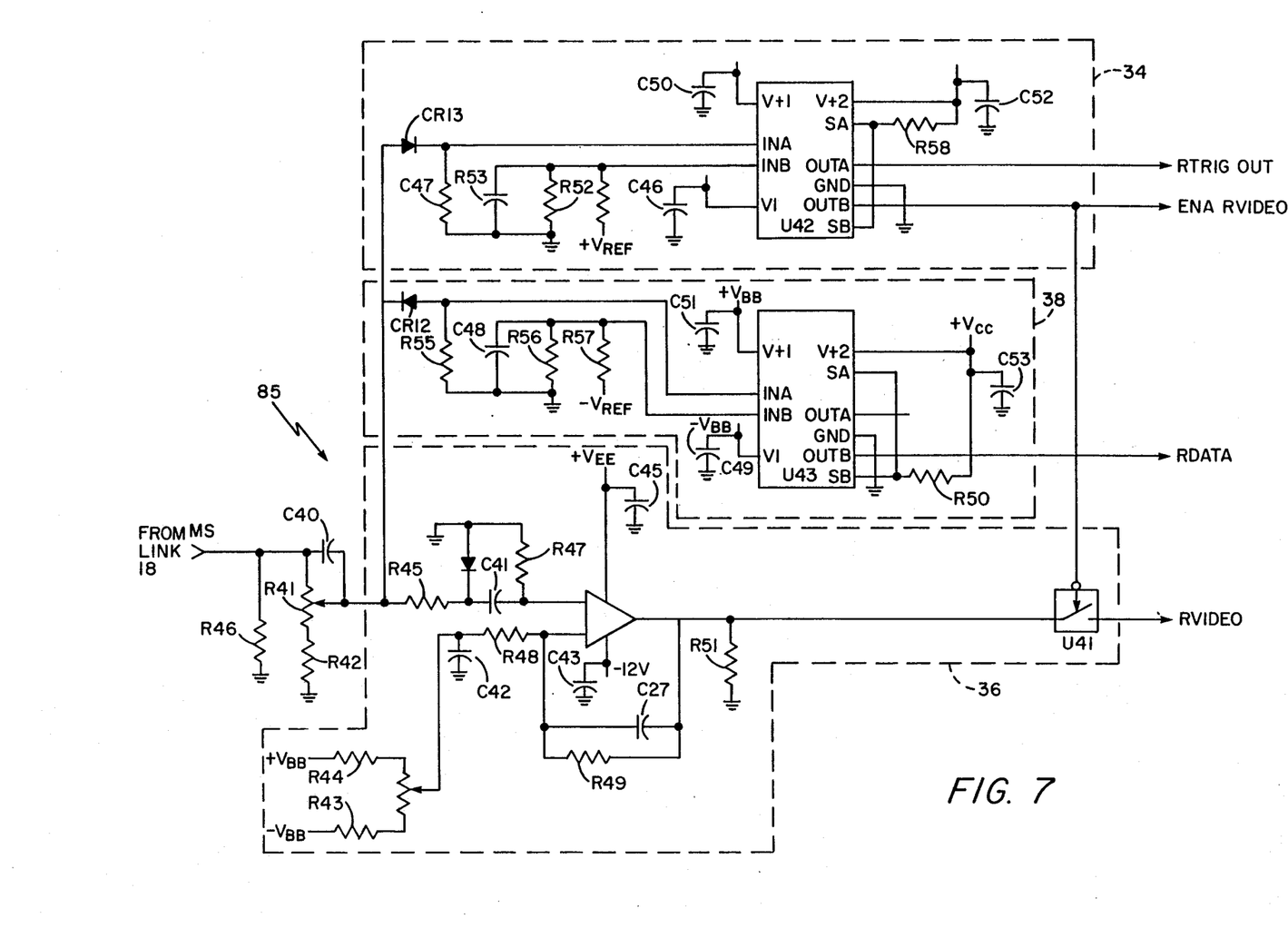
FIG. 7 is a schematic of the trigger, video, and data detector shown in FIG. 1.

FIG. 7 shows an embodiment for trigger detector 34, video detector 36, and data detector 38 forming portions of radar display 16. The multiplexed signal MS is coupled to termination resistor R46 and a high-pass filter 85 formed from series capacitor C40 and resistors R42 and potentiometer R41. Filter 85 provides an amplitude compensated multiplexed signal to each of the detectors 34, 36, and 38.

Trigger detector 34 includes an analog comparator 42, series input diode CR13, shunt resistor R54, filter capacitor C47, filter resistor R53, series reference voltage resistor R52, voltage supply by-pass capacitors C50, C46, and C52 and pull-up resistor R58. The compensated multiplexed signal MS is fed from high-pass filter 85 through forward bias diode CR13 to a first input INA of comparator U42. Shunt resistor R54 provides proper termination. Thus, current is directed to the input INA of comparator U42 only when multiplex signal MS has a positive polarity. Filter capacitor C47 and resistor R53, as well as series resistor R52, provide regulated voltage and current to input INB of comparator U42. U42 thus functions to compare the voltage at input INA to that of input INB and provide logic low output at output OUTA when input INA is less than input INB, and a logic high output when input INA exceeds input INB. Reference voltage $+V_{ref}$ is thus set to a voltage greater than the maximum voltage of the video portion of multiplex signal MS, but less than voltage when the trigger portion of multiplex signal MS is being sent. Output OUTA of comparator U42 thus serves as a reconstructed trigger signal RTRIG. The inverse of this signal provided at output OUTB of comparator U42 serves as an reconstructed enable video signal ENA RVIDEO. By-pass capacitors C50 and C46 serve to regulate the analog supplies $+V_{bb}$ and $-V_{bb}$ to comparator U42 and capacitor C52 serves to regulate the logic supply $+V_{cc}$. Strobe inputs of comparator U42 including SA and SB are enabled by coupling them to $+V_{cc}$ through a pull-up resistor R58.

Data detector 38 is similar to trigger detector 34. Thus, it also includes a comparator U43, series diode CR12, and pull-up resistor R55, filter capacitor C48, filter resistor R56, reference voltage series resistor R57, by-pass capacitors C49, C51, and C53 and pull-up resistor R50. Two differences are that series input diode CR12 conducts only when multiplexed signal MS has a negative polarity and that the reference voltage fed to input INB is coupled to a negative reference voltage $-V_{ref}$. Thus, when a signal fed to input INA of comparator U43 is negative and less than negative reference voltage $-V_{ref}$, output OUTB of comparator U43 is a logic high and at other times, it is a logic low. The output OUTB of comparator U43 is used as the reconstructed data signal RDATA.

Video detector 36 also operates on the output of high-pass filter 85 to provide a reconstructed video signal RVIDEO. It includes an operational amplifier U40 arranged to operate as a comparator. The non-inverting input of amplifier U40 is coupled through series resistor R45 and capacitor C41 to the output of high-pass filter 85. A shunt diode CR1 coupled between resistor R45 and capacitor C41 to analog ground blocks signal energy from entering the non-inverting input of amplifier U40 unless multiplex signal MS has a positive polarity. Series capacitor C41 and shunt resistor R47 serve as a high-pass filter. The inverting input of amplifier U40 is fed a reference voltage as selected by series resistor R44, potentiometer R40, and series resistor R43 coupled between a positive supply voltage $+V_{bb}$ and a negative supply voltage $-V_{bb}$. The reference voltage is filtered by shunt capacitor C42 and series resistor R48 before it is fed to the inverting input of amplifier U40 to provide DC nulling. By-pass capacitors C45 and C43 are coupled between the supply inputs of amplifier R40 and the positive and negative voltage supplies $+V_{ee}$ and $-V_{ee}$, respectively. Feed-back resistor R49 and parallel capacitor C27 provide feed-back from the output of amplifier U40 to its inverting input. Amplifier U40 thus allows a signal to pass to its output only when its non-inverting input is a positive voltage greater than the reference voltage set at its inverting input. A termination resistor R51 provides proper output impedance. If desired, analog switch U41 may be coupled to the output of amplifier U40 and controlled by the ENA RVIDEO signal so that the reconstructed video signal RVIDEO is only made available when a reconstructed trigger RTRIG is not presently indicated.

Figure 8:
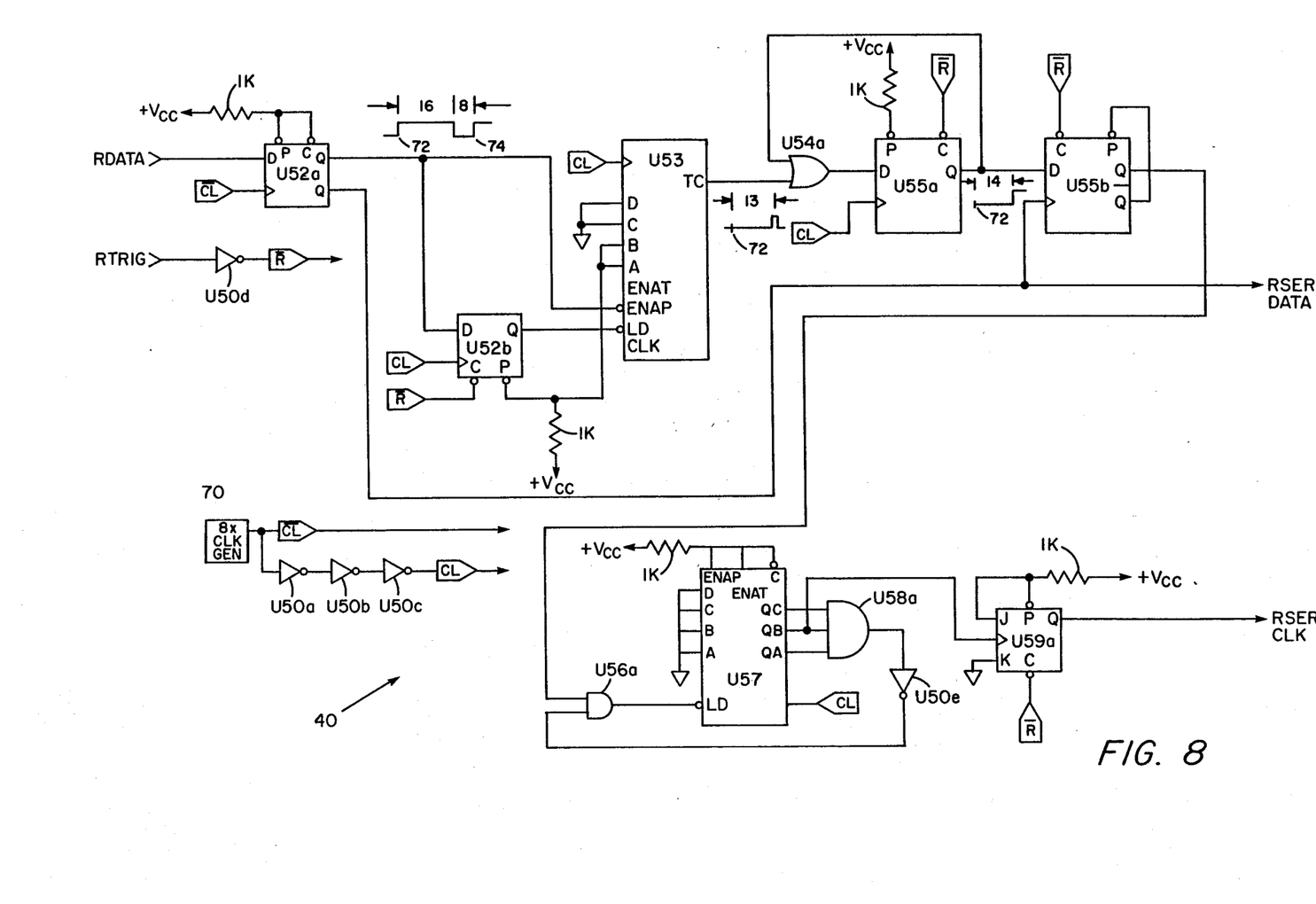
FIG. 8 is a schematic of a sychronization detector.

FIG. 8 shows an embodiment of sychronization detector 40 with greater detail. This circuit operates on the reconstructed data RDATA and reconstructed trigger RTRIG signals to determine when a data portion of multiplex signal MS has occurred. It determines this by looking for the preamble sychronization portion of multiplexed signal MS. The preamble sychronization is indicated by two logic ones followed by a logic zero. Once this preamble sychronization has been detected, it is known the following bits are actually data bits forming the multiplex signal MS, corresponding to the DATA signal. These bits are provided as a serial data signal RSER DATA. A reconstructed clock RSER CLK provides a rising edge when a valid bit of the data portion of multiplex signal MS is present in the RSER DATA signal. Synchronous detector 40 includes flip-flops U52a, U52b, U55a, U55b, and U59a, four bit counters U53 and U57, inverters U50a through U50e, or-gate U54a, and-gates U56a and U58a and an eight times clock generator 70. Eight times clock generator 70 may be constructed much as multiplexer clock 52 of FIG. 4 was constructed. However, it provides a digital clock signal at an output $\overline{CL}$ at a rate eight times the bit rate of the DATA signal. Three cascaded inverters U50a, U50b, and U50c are coupled to inverted clock $\overline{CL}$ to provide a clock signal CL. As will be seen shortly, this is used to provide multiple samples of each data bit to assist in the detection process. Reconstructed trigger RTRIG is fed to an inverter U50d to provide a not-reset $\overline{R}$ signal.

RDATA is first fed to flip-flop U52a to sample it at eight times the frequency of data contained therein. Flip-flop U52a has its pre-set and clear inputs $\overline{P}$ and $\overline{C}$, respectively, disabled by tying them through a 1K ohm pull-up resistor to $+V_{cc}$. The inverted clock $\overline{CL}$ is fed to the clock input of U52a. The $\overline{Q}$ output of flip-flop U52a is used as the RSER DATA signal. This signal will contain both the preamble sychronization portion followed by data portions extracted from multiplex signal MS. The rest of synchronous detector 40 serves to provide the serial clock RSER CLK signal that has positive going edges only when portions of RSER DATA have valid data. In particular, the rest of the synchronous detector 40 is concerned with determining what data bit is presently being sent and recognizing two logic ones followed by a logic zero occurring after the occurrence of a reconstructed trigger signal RTRIG. The output Q of flip-flop U52a is fed both to a first enable input ENAP of counter U53 and the D input of another flip-flop U52b. This flip-flop is clocked by the clock signal CL. As indicated in the signal drawn adjacent the Q output of U52a, synchronous detector 40 serves to recognize a signal having a rising edge 72 and continuing at a logic one for 16 periods of clock signal CL and then having 8 clock periods with a logic zero. At this point 74, preamble synchronization has been indicated. U52b has a clear input C that is tied to the not-reset signal $\overline{R}$. Thus, the output Q of U52b remains low until such time as the reconstructed trigger signal RTRIG becomes false and a positive voltage rising edge 72 occurs in the Q output of U52a. The Q output of U52b is tied to a $\overline{LD}$ input of counter U53. U52b thus functions as a glitch detector. If its incoming input should go low before the complete preamble has occurred (as in a glitch), U52b reloads counter U53 to its initial value, thus causing it to wait for another preamble. Its preload inputs A through D are set to logic value 0011. The Q output of U52a is fed to the enable input ENAP of counter U53 so that counter U53 begins counting one clock after the occurrence of rising edge 72, as U52b's output must go high to enable U53. As indicated by the signal drawn adjacent the TC output of counter U53, after the occurrence of twelve additional pulses in clock signal CL, output TC becomes high. The TC output is high only when all four bits of counter U53 are high or at a count of fifteen, so that the output TC will return to a logic zero as counter U53 continues to be clocked. Flip-flop U55a is cleared by the occurrence of reset signal $\overline{R}$. Its output Q remains a zero while U53 is counting as it is fed back through or-gate U54a to its data input D. Upon the occurrence of the first logic high in the TC output of U53, the Q output of flip-flop U55a becomes a logic one. Thus, as shown in the signal drawn adjacent U55a, its Q output remains a logic zero after the occurrence of rising edge 72 for a period of fourteen cycles of clock CL. The Q output of U55a is used as D input to flip-flop U55b which is clocked by the inverted input $\overline{Q}$ of U52a. Thus, U55b, having been cleared by the occurrence of reset signal $\overline{R}$ provides a logic zero output after the occurrence of a rising edge in the output of U55a, causing glitch detector U52b to be disabled, and enables a divide-by-eight circuit 93. Divide-by-eight circuit 93 is constructed from and-gate U56a, four-bit counter U57, and three input and gate U58a. The $Q_a$, $Q_b$, and $Q_c$ outputs of counter U57 are each fed to a corresponding input of and-gate U58a. U58a, through inverter U50e, is fed back to a load input $\overline{LD}$ of U57. The Q output of flip-flop U55b is used to enable the load input of U57. After this time, U57 is allowed to operate. Divide-by-eight circuit 93 thus divides each bit of RSER DATA into eight segments. A final JK flip-flop U59a may be coupled to the $Q_b$ output of U57 to provide a 50% duty cycle clock RSER CLK at a rate one-eighth that of the data rate of data portions of multiplex signal MS. RSER CLK changes state during every second and sixth segment of a bit of RSER DATA.

Figure 9:
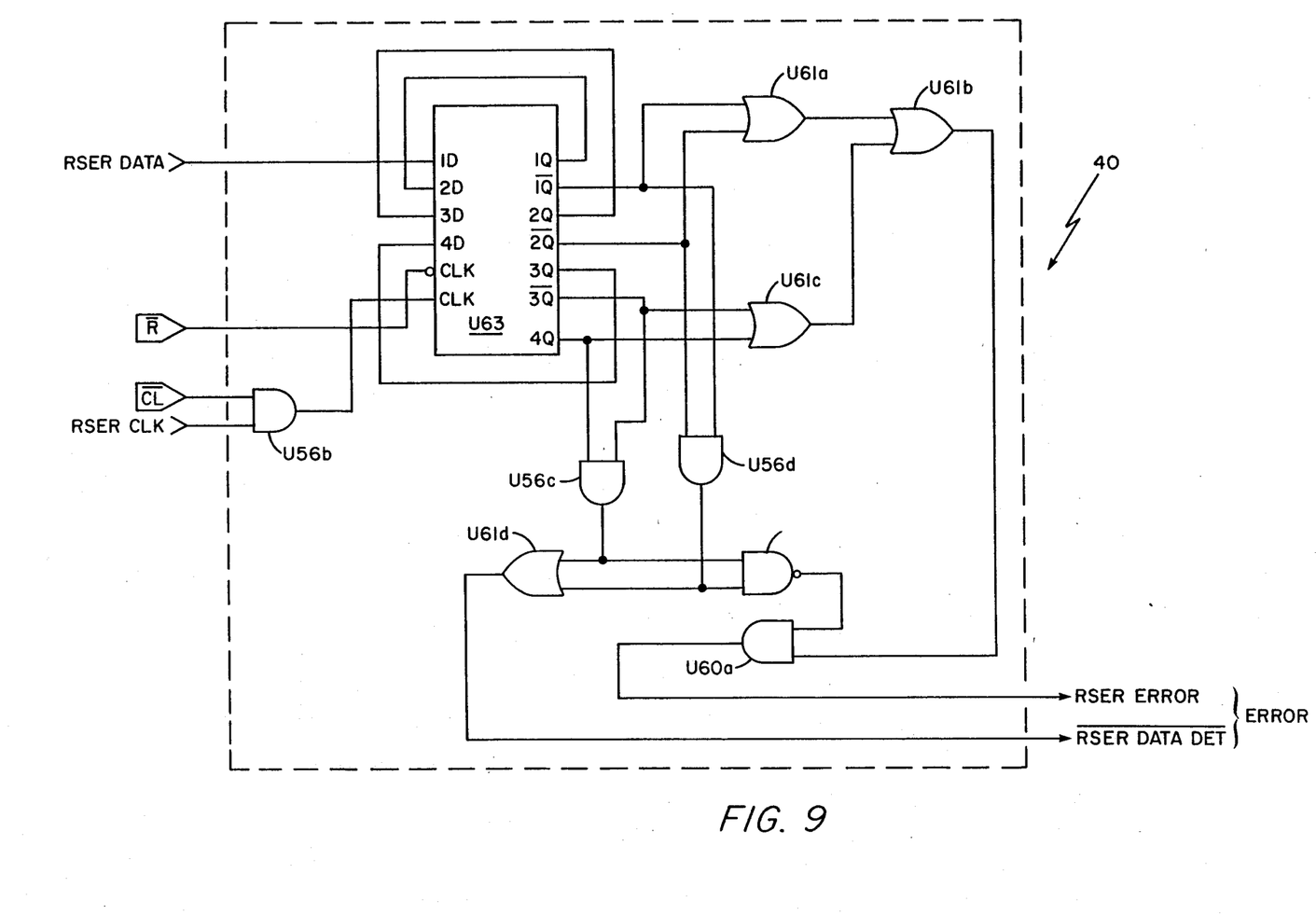
FIG. 9 shows other portions of the synchronization detector of FIG. 8.

FIG. 9 shows additional circuitry capable of operating on the output of the synchronous detector 40 circuit shown in FIG. 8. This circuitry provides an error signal ERROR indicating when an error has occurred in the RSER DATA detection process. This circuit operates on the RSER DATA, RSER CLK, $\overline{CL}$, and $\overline{R}$ signals to provide such an error signal in the form of a reconstructed serial error signal RSER ERROR and a reconstructed serial data detect signal $\overline{RSER\ DATA\ DET}$. A reset signal $\overline{R}$ is used to reset a four bit register U63. The D inputs and Q outputs of register U63 are arranged so it operates as a serial shift register, by tying the 1Q output to the 2D input, the 2Q output to the 3D input and the 3Q output to the 4D input. Register U63 is clocked at four times the data rate by providing its clock input with the output of an and-gate U56a coupled to the clock signal $\overline{CL}$ and the RSER CLK. Thus, four clock pulses are provided at the output of and-gate U56b for each data bit in multiplex signal MS. If synchronization is perfect and data is properly detected, each of the Q outputs 1Q through 4Q will thus have a zero when a zero is present in the data portion of multiplex signal MS and each will have a one when a one is present. A voting circuit formed by and-gates U56c, U56d, and or-gate U61d coupled respectively to the $\overline{1Q}$, $\overline{2Q}$ and $\overline{3Q}$, $\overline{4Q}$ outputs of register U63 provide a signal SER DATA DET that is a one when both 1Q and 2Q are zeros or both 3Q and 4Q are zeros. This indicates that two or more of the bits in U63 are determining the data is a zero. The outputs of and-gates U56c and U56d are also fed to and-gate U42a. The output of and-gate U42a is a zero only when the outputs 1Q, 2Q, 3Q, and 4Q are all zeros. Or-gates U61a, U61b, and U61c serve to provide at the output of U61b a signal that is a one only when the outputs 1Q, 2Q, 3Q, and 4Q are all ones. Thus, by anding the output of 42a and U61b together by and-gate U60a, a RSER ERROR signal is provided having a one state only a one when all samples coincide and a zero state when at least one sample is different from the others. This circuit thus functions as a four input exclusive −or and can be used as an indication of detection process error.

The following tables shown the part numbers of readily available components and manufacturers for the preferred embodiment of the circuits shown in FIGS. 4 through 9. The supply and references voltages are also shown.

| Part Number | Type | Manufacturer |
|---|---|---|
| U1 | 74LS 221 | Texas Instruments, Dallas TX |
| U2, U50 | 74LS 04 | Texas Instruments, Dallas TX |
| U3-U6 | 74LS 191 | Texas Instruments, Dallas TX |
| U7, U56, U60 | 74LS 08 | Texas Instruments, Dallas TX |
| U8, U62 | 74LS 00 | Texas Instruments, Dallas TX |
| U9, U58 | 74LS 11 | Texas Instruments, Dallas TX |
| U10, U54, U61 | 74LS 32 | Texas Instruments, Dallas TX |
| U11, U52, U55, U59 | 74LS 74 | Texas Instruments, Dallas TX |
| U14-U15 | 74LS 165 | Texas Instruments, Dallas TX |
| U53, U57 | 74LS 161 | Texas Instruments, Dallas TX |
| U63 | 74LS 175 | Texas Instruments, Dallas TX |
| U17, U20, U44 | HI5041-5 | Harris Semiconductor, Melbourne FL |
| U19, U21, U40 | HA 2540 | Harris Semiconductor, Melbourne FL |
| U42-U43 | NE 527 | Signetics Corporation, Sunnyvale CA |
| Q1, Q20 | 2N2219A | Motorola Semiconductor, Phoenix AZ |
| Q2, Q21 | 2N2905A | Texas Instruments, Dallas TX |
| CR1, CR2, CR20 | 1N4148 | Texas Instruments, Dallas TX |
| CR12, CR13 | 1N6263 | Texas Instruments, Dallas TX |

| Part Number | Nominal Value | Part Number | Nominal Value |
|---|---|---|---|
| C2, C10 | 10 pf | R2 | 15 k |
| C5, C54 | 2 pf | R3, R20, R21, R50, R58 | 1 k |
| C6, C8 | .01 f | | |
| C7, C9 | 10 f | R4, R5 | 3.3 k |
| C11 | .22 f | R6, R9, R12, R28, R30 | 10 |
| C22 | 75 pf | R7, R8, R24, R26 | 5.1 k |
| C12, C20, C21 | 0.1 f | R10, R11, R27, R29 | 2.7 k |
| C23, C24, C43 C45-C53 | 0.1 f | R22 | 510 |

| Supply Voltages | | Part Number | Nominal Value |
|---|---|---|---|
| ± V$_{ref}$ | ± 5v | R23, R43, R44 | 1.5 k |
| | | R25 | 680 |
| ± V$_{BB}$ | ± 8v | R40 | 200 |
| ± V$_{DD}$ | ± 15v | R41 | 2 k |
| ± V$_{EE}$ | ± 12v | R42 | 820 |
| V$_{cc}$ | ± 5v | R45 | 2.49 k, 1% |
| | | R46 | 51 |
| | | R47 | 4.3 k |
| | | R48 | 5.11 k, 1% |
| | | R49 | 4.02 k, 1% |
| | | R51 | 2.4 k |
| | | R52 | 25.5 k, 1% |
| | | R53 | 34.8 k, 1% |
| | | R54 | 22 k |
| | | R55 | 10 k |
| | | R56 | 10 k, 1% |
| | | R57 | 100 k, 1% |

Having described preferred embodiments of this invention, it will now be evident that other embodiments incorporating these concepts may be used. For example, other clock rates, synchronization detection schemes, comparator voltage levels, components, and circuit arrangements may be used to provide the functions described. While PPI 42 has been shown as one accepting serial data as input, other displays may require parallel data input and appropriate serial to parallel data conversion circuits known in the art may be used with this invention. The trigger, video and data portions can be sent in different order, or have other polarities, as long as the video portion has a polarity opposite that of the data portion.

In view of these and other evident possible variations, this invention is not intended to be restricted to the disclosed embodiments, but rather to be limited only by the spirit and scope of the claims that follow.

What is claimed is:

1. A method for sending multiple signals over a single cable, from a video source to a display, comprising the steps of:
    coupling a trigger signal to the cable, the trigger signal having a minimum nominal voltage level;
    coupling a time-length variable video signal to the cable, after the trigger signal is coupled, the video signal having a polarity and also a maximum amplitude less than the trigger pulse minimum nominal voltage;
    determining when the time-length variable video signal terminates; and
    coupling a data signal to the cable after determining that the time-length variable video signal has terminated, the data signal having a polarity opposite the video signal polarity.

2. A method as in claim 1 additionally comprising:
    providing a received signal from the cable; and
    detecting the presence of the trigger signal by comparing the received signal with the trigger signal maximum voltage level.

3. A method as in claim 2 additionally comprising:
    detecting the presence of the video signal by determining when the trigger signal ends.

4. A method as in claim 3 additionally comprising:
    detecting the presence of the data signal by comparing the received signal to a predetermined reference voltage.

5. The method as recited in claim 1 wherein said data signal has a predetermined time-length.

6. A multiplexer comprising:
    means, fed by a first input signal having a trigger pulse followed by a time-length variable video pulse, the video pulse maximum amplitude being less than a minimum logic high level of the trigger pulse, for coupling the first input signal to a multiplexer output as a first unipolar signal;
    means for determining when the time-length variable video pulse terminates; and
    means, fed by a second input signal, for coupling the second input signal to the multiplexer output as a second unipolar signal when the time-length variable video pulse terminates, said second unipolar signal having a polarity opposite the polarity of the first unipolar signal.

7. Apparatus as in claim 6 additionally comprising:
    means for providing a trigger signal; and
    amplifier means, having an inverting input and a non-inverting input, the trigger signal coupled to the noninverting input and the multiplexer output coupled to the inverting input.

8. Apparatus for sending multiple signals over a single link comprising:
   trigger means, coupled to the link, for providing a trigger signal having a maximum nominal voltage level;
   video means, coupled to the link, for providing a time length variable video signal after the trigger signal, the video signal having a polarity and also a maximum amplitude less than the trigger signal maximum nominal voltage;
   time means, coupled to the link, for determining when said time-length variable signal terminates; and
   data means, coupled to the link and said time means, for providing a data signal when said timing means determines that the time-length variable video signal has terminated, the data signal having a polarity opposite the polarity of the video signal.

9. Apparatus as in claim 8 additionally comprising:
   means, coupled to the link, for providing a received signal; and
   trigger detecting means, coupled to the link, for detecting the trigger signal by comparing the received signal with the trigger signal maximum nominal voltage level.

10. Apparatus as in claim 9 additionally comprising:
    video detecting means, coupled to the trigger detecting means, for detecting the presence of the video signal by determining when the trigger signal ends.

11. Apparatus as in claim 10 additionally comprising:
    data detecting means, coupled to the cable, for detecting the presence of the data signal by comparing the received signal with a reference voltage.

12. Apparatus as in claim 8 additionally comprising:
    video detecting means, coupled to the cable, for detecting the presence of the video signal by comparing a link output signal to a predetermined reference voltage.

13. Apparatus as in claim 12 additionally comprising:
    data detecting means, coupled to the cable, for detecting the presence of the data signal by comparing the received signal to a predetermined reference voltage.

14. An electronic communication apparatus comprising:
    an operational amplifier having an inverting input, a non-inverting input, and an output;
    means, fed by a trigger signal, for selectively coupling the trigger signal to the operational amplifier non-inverting input when the trigger signal is in a true state;
    means, fed by the trigger signal and an analog video signal, for selectively coupling the video signal to the operational amplifier non-inverting input when the trigger signal is in a false state;
    means, fed by the video signal, for determining when said video signal terminates; and
    means, fed by a digital data signal, for selectively coupling the digital signal to the operational amplifier inverting input when the video signal terminates.

15. Apparatus as in claim 14 additionally comprising:
    trigger comparator means, coupled to the operational amplifier output and a predetermined trigger threshold voltage, for reconstructing the trigger signal.

16. Apparatus as in claim 14 additionally comprising:
    video comparator means, coupled to the operational amplifier output and a predetermined video threshold, for reconstructing the video signal.

17. Apparatus as in claim 14 additionally comprising:
    digital comparator means, fed by the operational amplifier output and a predetermined digital threshold, for reconstructing the digital signal.

18. Apparatus as in claim 14 additionally comprising:
    trigger comparator means, coupled to the operational amplifier output and a predetermined trigger threshold voltage, for reconstructing the trigger signal;
    video comparator means, coupled to the operational amplifier output and a predetermined video threshold, for reconstructing the video signal; and
    digital comparator means, fed by the operational amplifier output and a predetermined digital threshold, for reconstructing the digital signal.

19. A radar system comprising:
    a radar display;
    a link coupled at one end to the radar display;
    a radar transceiver, coupled at another end of the link and thus to the display, the transceiver additionally comprising:
    means for providing a time-length variable video signal having a maximum voltage, the video signal being a positive unipolar signal;
    means for providing a trigger pulse having a logic true voltage level greater than the time-length variable video signal maximum voltage;
    means for determining when said time-length variable signal has terminated;
    means for providing a digital signal after the time-length variable video signal has terminated, the digital signal indicating transceiver status, the digital signal being a negative unipolar signal; and
    means, coupled to the link, for summing the time-length variable video signal, the trigger pulse and the digital signal.

20. Apparatus as in claim 19 where the radar display comprises:
    means, coupled to the link, for providing a received signal; trigger comparator means, coupled to the received signal, for comparing the input signal to a predetermined trigger threshold to provide a trigger signal;
    video comparator means, coupled to the received signal, for comparing the input signal to a predetermined video threshold to provide a video signal; and
    digital comparator means, coupled to the received signal, for comparing the input signal to a predetermined digital threshold to provide a digital signal.

21. A radar system comprising:
    video means, fed by a radar transceiver, for providing a trigger signal and a time length varying radar video signal;
    means for determining when said time length varying radar video signal has terminated;
    data means, fed by the radar transceiver, for providing a data signal after said video signal has terminated;
    time multiplexer means, fed by the trigger signal, the video signal, the data signal, and also fed by a pulse repetition frequency signal, for periodically selecting as a multiplexer output one of the trigger, video, or data signal in accordance with the pulse repetition frequency signal.

22. A radar system comprising:
video means, fed by a radar transceiver, for providing a trigger signal and a time length varying radar video signal;
means for determining when said time length varying radar video signal has terminated;
data means, fed by the radar transceiver, for providing a data signal after said video signal has terminated;
time multiplexer means, fed by the trigger signal, the video signal, the data signal, and also fed by a pulse repetition frequency signal, for periodically selecting as a multiplexer output one of the trigger, video, or data signals in accordance with the pulse repetition frequency signal; and
a video counter, coupled to and initialized by the trigger signal, and providing an enable trigger signal, an enable video signal, and an enable data signal.

23. Apparatus as in claim 22 where the multiplexer means additionally comprises:
comparator means, coupled to the counter and fed by the range signal, for disabling the counter when an output of the counter matches the pulse repetition frequency signal.

24. Apparatus as in claim 22 where the time multiplexer means additionally comprises:
switch means, fed by the video signal, the trigger signal, and the enable trigger signal, for selecting one of the video signal or trigger signal as a switch output in accordance with the enable trigger signal;
summing means, fed by the switch output at a non-inverting input and the data signal at an inverting input, for providing the multiplexer output.

25. An apparatus for sending radar signals from a radar antenna over a single link, said apparatus comprising:
video means, coupled to said link for providing a video signal of finite duration containing radar video information, said video signal having a maximum and minimum voltage level, said video signal being a positive unipolar signal that varies between said minimum and maximum voltage levels;
trigger means, coupled to said link for providing a trigger signal having a pulse with a positive voltage level greater than said video signal maximum voltage level;
timing means for determining when said video signal terminates; and
data means, coupled to said link, for providing a data signal containing radar status information wherein said data signal is a negative unipolar signal, and for providing said data signal after said timing means determines that said video signal has terminated to prevent said data signal from interfering with said video signal.

26. The apparatus as recited in claim 25 wherein the voltage level of said data signal is substantially equal in opposite polarity to said maximum voltage level of said video signal.

27. The apparatus as recited in claim 25 further comprising means for providing a pulse repetition frequency signal and wherein said video means provides said video signal with a duration responsive to said pulse repetition frequency signal.

28. The apparatus as recited in claim 25 wherein said video signal is time-length variable.

29. The apparatus as recited in claim 25 wherein said radar status information includes the position of the radar antenna for the radar video information.

* * * * *